US 6,654,805 B1

(12) United States Patent
Aldred et al.

(10) Patent No.: US 6,654,805 B1
(45) Date of Patent: Nov. 25, 2003

(54) DATA PROCESSING TECHNIQUE FOR MESSAGE TRACING IN AN ASYNCHRONOUS MESSAGING NETWORK

(75) Inventors: Barry Keith Aldred, Winchester (GB); Paul Anthony Beaven, Romsey (GB); Brian Phillip Ernest Fisk, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 666 days.

(21) Appl. No.: 09/617,698

(22) Filed: Jul. 17, 2000

(30) Foreign Application Priority Data

Sep. 29, 1999 (GB) .............................................. 9922912

(51) Int. Cl.$^7$ .............................................. G06F 13/00
(52) U.S. Cl. .................................................... 709/224
(58) Field of Search ................................. 709/200, 201, 709/203, 217, 218, 219, 224, 227, 228

(56) References Cited

U.S. PATENT DOCUMENTS

| | | | |
|---|---|---|---|
| 5,384,768 A | * 1/1995 | Fujii | 370/14 |
| 5,477,536 A | * 12/1995 | Picard | 370/54 |
| 5,668,800 A | 9/1997 | Stevenson | 370/248 |
| 5,675,741 A | * 10/1997 | Aggarwal et al. | 709/212 |
| 5,805,798 A | 9/1998 | Kearns et al. | 395/185.01 |
| 5,822,533 A | * 10/1998 | Saito et al. | 709/201 |
| 5,825,751 A | 10/1998 | Papierniak et al. | 370/248 |
| 5,862,335 A | * 1/1999 | Welch, Jr. et al. | 709/201 |
| 5,862,336 A | * 1/1999 | Nakagaki et al. | 709/200 |
| 6,078,957 A | * 6/2000 | Adelman et al. | 709/200 |

FOREIGN PATENT DOCUMENTS

GB 2330741 A 4/1999

OTHER PUBLICATIONS

Bristol Technology News, Press Release Apr. 25, 2000, "Bristol Technology Inc. Announces eSLEUTH, Revolutionary e–Business Transaction Analysis software for IBM MQSeries", pp. 1–3.
BEA MessageQ Programming Services, third section entitled "Application Testing and Debugging Tools", pp. 1–4 (Updated: Apr. 8, 1998).

* cited by examiner

Primary Examiner—Moustafa M. Meky
Assistant Examiner—Ramy M. Osman
(74) Attorney, Agent, or Firm—A. Bruce Clay

(57) ABSTRACT

In an asynchronous message queuing network, a data processing method of finding a lost message includes the steps of: sending a first message from an originating data processing unit to an intermediate data processing unit, the message including an indication that the message is traceable; sending a tracer message from an originating data processing unit to an intermediate data processing unit, the tracer message identifying the first message as a lost message which the originating data processing unit would like to find; at the intermediate data processing unit, upon receiving the tracer message, checking to determine whether the first message exists within the intermediate data processing unit, and sending a reply message back to the originating unit if the first message is found within the intermediate data processing unit; and at the intermediate data processing unit, if the first message is not found within the intermediate data processing unit, determining whether the first message has passed through the intermediate data processing unit, and if the first message has passed through the intermediate data processing unit, determining a neighboring data processing unit which received the first message from the intermediate data processing unit and forwarding the tracer message to the neighboring data processing unit.

5 Claims, 3 Drawing Sheets

DATA PROCESSING TECHNIQUE FOR MESSAGE TRACING IN AN ASYNCHRONOUS MESSAGING NETWORK

CROSS REFERENCE TO RELATED APPLICATIONS

The present application is related to U.S. Pat. Ser. No. 09/300,045 filed Apr. 27, 1999, titled "Data Processing with Distributed Messaging Problem Determination" commonly assigned with the present application, now U.S. Pat. No. 6,487,593.

FIELD OF THE INVENTION

This invention relates to the field of distributed data processing where a data processing operation takes place over a plurality of data processing units which are connected to each other via a network.

BACKGROUND OF THE INVENTION

It is increasingly common to distribute a data processing operation over a plurality of data processing units, with each of the units communicating over a data communications network (e.g., the Internet). One reason for this is that a particular data processing unit may be able to do a job better than another, so a first unit makes a request for a second unit to do a particular job and then to return the result back to the first unit.

It is also very common for there to be a large number of intermediate data processing units (also known as "nodes") in between the originating unit that makes a request and the destination unit that is being requested to do the work. Each intermediate unit receives the request, performs some initial processing to determine what to do with it, and then forwards it on to the next unit.

A popular mechanism for carrying out such distributed data processing is called asynchronous message queuing, where applications communicate with each other by sending messages to queues, which can then be accessed by the receiving application at a time that is convenient for that receiving application. IBM's MQSeries (trademark) software product, which has been on the market for a number of years, is the most popular example of this type of software.

Frequently, messages which flow between data processing units in an asynchronous message queuing network are considered "high value" messages, and for such messages it is very important for the originating data processing unit to be able to locate such messages should they become lost on their way to the destination unit. The term "lost" is taken to mean that the message is safe, but its location is unknown. A message could be lost, for example, if a link is broken between units or if the target messaging address is not known on one of the intermediate nodes. In such situations, the message will be unable to advance towards the destination unit until either the link is repaired or by correcting the routing (i.e., address resolution) configuration on the node in error.

The only way known in the prior art to locate such lost messages would be to have an operator "visit" (either physically or electronically) each of the nodes of the messaging network and search through the various message queues (e.g., the dead letter queues (DLQs) and the transmission queues (TXQs). However, this is obviously very time consuming and inefficient.

Various prior art teachings have employed a test message which is sent by an originating data processing unit into the network of intermediate units on its way to a destination unit. The test message arrives at various intermediate units in the network on its way to the destination unit and reports are sent back to the originating unit by each intermediate unit to report the exact path that the test message took on its way through the network. For example, the well known Advanced Peer to Peer Networking (APPN) and TCP/IP (Transmission Control Protocol/Internet Protocol) provide such functionality. U.S. Pat. No. 5,668,800 (commonly assigned to IBM Corp.) is another example of such prior art. See also, IBM's co-pending patent application entitled "Data Processing with Distributed Messaging Problem Determination" (IBM docket no. UK9-98-137, U.S. Pat. Ser. No. 300,045 filed Apr. 27, 1999, corresponding to UK patent application no. GB 9828686.7 filed Dec. 24, 1998). However, such prior art identifies the path of a test message but does not locate the lost (application) message. Such prior art provides an operator with a possible (but not guaranteed) route that a lost message might have taken.

SUMMARY OF THE INVENTION

According to one aspect, the present invention provides in an asynchronous message queuing network, a data processing method of finding a lost message, including steps of: sending a first message from an originating data processing unit to an intermediate data processing unit, the message including an indication that the message is traceable; sending a tracer message from an originating data processing unit to an intermediate data processing unit, the tracer message identifying the first message as a lost message which the originating data processing unit would like to find; at the intermediate data processing unit, upon receiving the tracer message, checking to determine whether the first message exists within the intermediate data processing unit, and sending a reply message back to the originating unit if the first message is found within the intermediate data processing unit; and at the intermediate data processing unit, if the first message is not found within the intermediate data processing unit, determining whether the first message has passed through the intermediate data processing unit, and if the first message has passed through the intermediate data processing unit, determining a neighboring data processing unit which received the first message from the intermediate data processing unit and forwarding the tracer message to the neighboring data processing unit.

According to a second aspect, the invention provides an intermediary data processing apparatus for use in an asynchronous messaging and queuing data processing network, the apparatus having: a receiving unit for receiving a message from a first data processing apparatus; a forwarding unit for forwarding the received message on to a second data processing apparatus; a determining unit for determining whether a message received from the first data processing apparatus has a flag set to indicate that the received message is traceable; a storing unit for storing, in response to the determining unit determining that a message has been received with the flag set, an indication that the received message has the flag set to indicate that the received message is traceable and for storing an indication of the second data processing apparatus which the forwarding unit has forwarded the received message on to; a unit for receiving a tracer message from the first data processing application, the tracer message including an indication of a lost message; a unit for, in response to receipt of the tracer message, determining whether the lost message exists within the intermediary data processing apparatus, and, if the lost message does not exist within the intermediary data processing apparatus, consulting the storing unit and using the stored indication of the second data processing apparatus to forward on the tracer message to the second data processing apparatus that corresponds to the stored indication, so that the tracer message follows the path taken by the lost message.

According to a third aspect, the invention provides a method corresponding to the apparatus of the second aspect.

According to a fourth aspect, the invention provides a computer program product, stored on a computer readable storage medium for, when run on a computer, carrying out the method of the third aspect.

Accordingly, with the present invention, lost messages can be found in a highly efficient manner without requiring that an operator "visit" each node in the network to search manually for the lost message. Instead, the tracer message traverses the network following the same path that the lost message took, making the search for the lost message very quick and efficient. That is, nodes that the lost message did not enter are not searched thus greatly speeding up the process of finding a lost message.

BRIEF DESCRIPTION OF THE DRAWINGS

The invention will be better understood by reference to the detailed description of a preferred embodiment thereof which will be given below in conjunction with the following drawing figures.

DETAILED DESCRIPTION OF THE PREFERRED EMBODIMENTS

Figure 1:
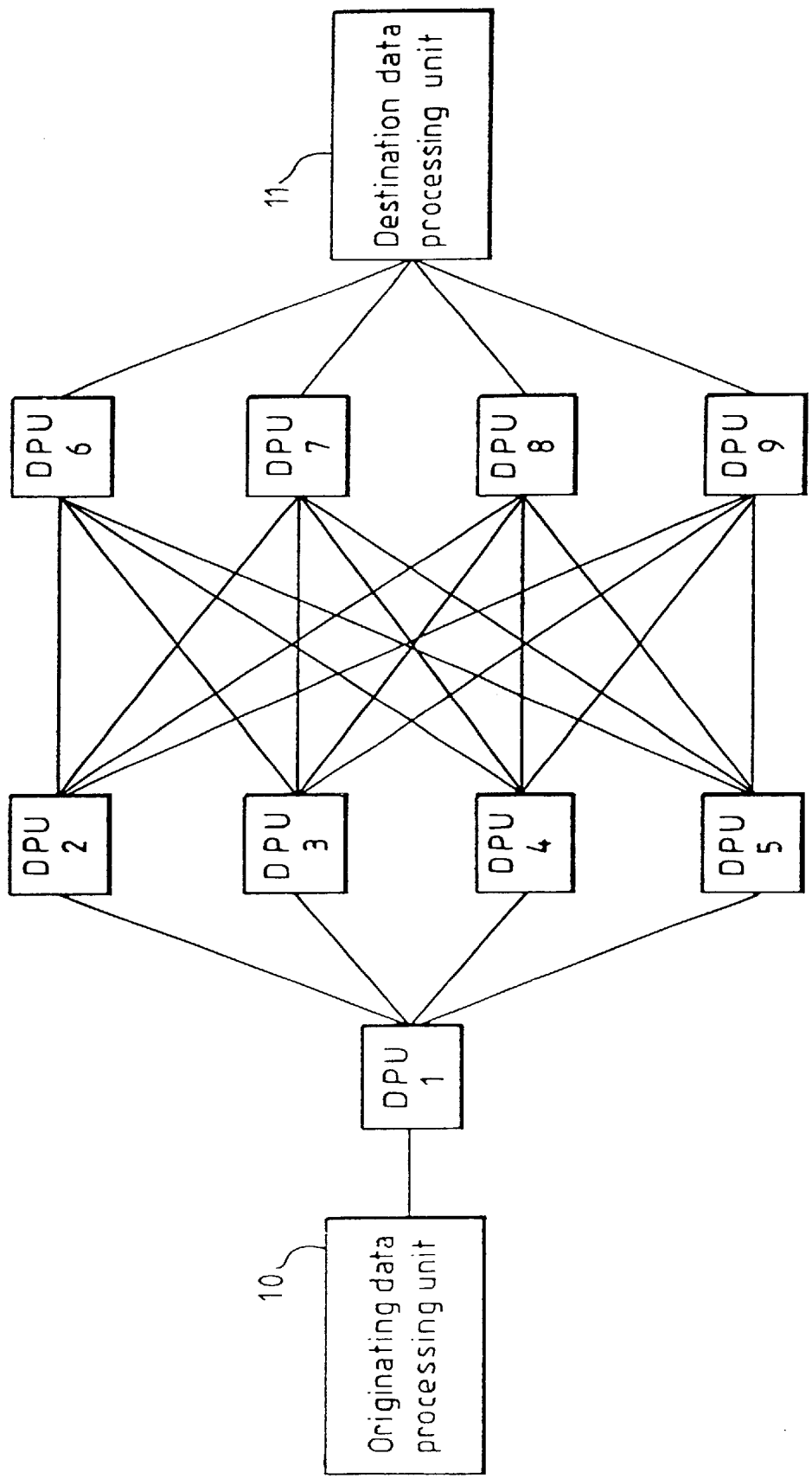
FIG. 1 shows a group of interconnected data processing units forming a network, to which the preferred embodiment can advantageously be applied.
Figure 2:
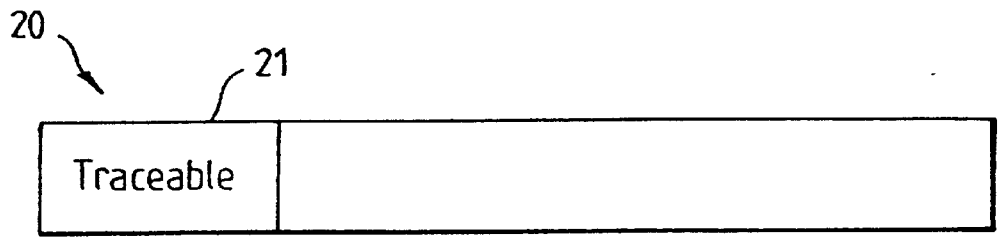
FIG. 2 shows the partial format of a message, according to a preferred embodiment of the present invention.

In FIG. 1, an originating data processing unit 10 sends a message (20 in FIG. 2) through a network of intermediate data processing units 1–9 (DPU 1–DPU 9) to a destination data processing unit 11. A class of service indicator (flag) 21 is set to the value "traceable" which indicates that this message 20 is a "high value" message which the originating node 10 will want to find if the message 20 becomes lost.

Figure 3:
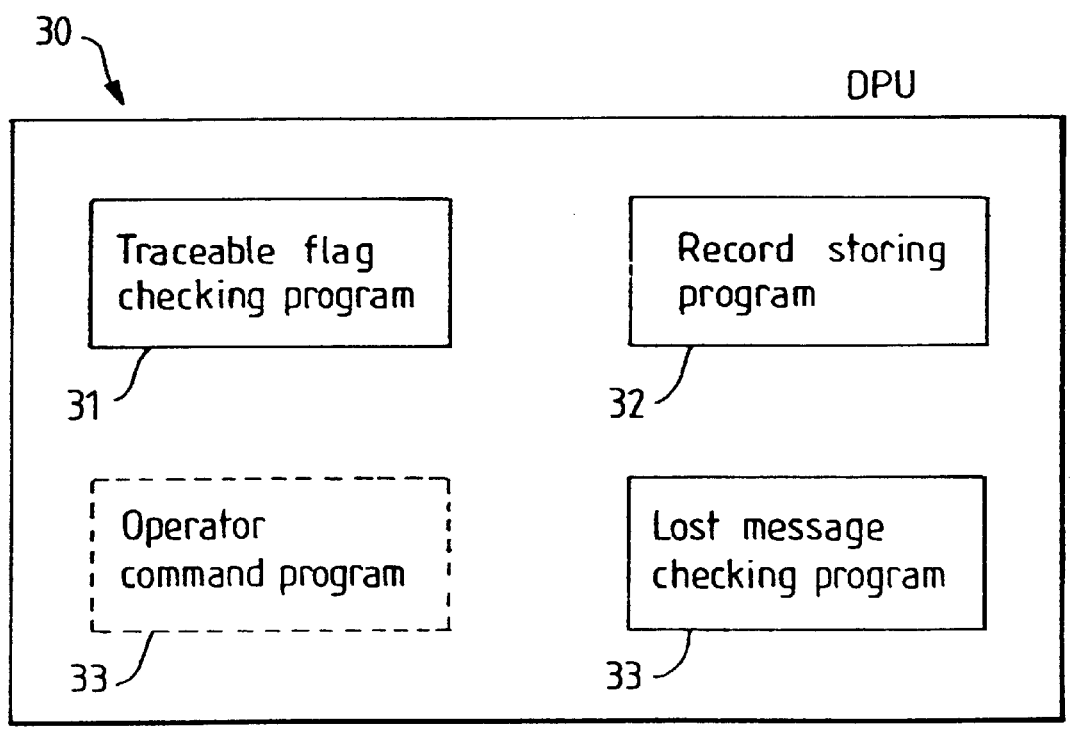
FIG. 3 is a block diagram showing some of the programs included within a data processing node according to a preferred embodiment of the present invention.

As shown in FIG. 3, a data processing unit 30, such as DPU 1–9 in FIG. 1, according to a preferred embodiment of the present invention, includes a traceable flag checking program 31 that runs on each node in the network. This may be part of the message moving program or might be part of the queue manager software. The purpose of this program is to record the passage of messages moving through the node, that have been marked as traceable with the above flag 21.

Also included in DPU 30 is a record storing program 32 for storing records that indicate that a traceable message has passed through the node (DPU 30), and which link the message was sent down as the next hop. This might take the form of a file on disk or a queue. The trace information will be written transactionally and will persist across system failures. The information written will include the unique message identifier (id) of the message being traced. (It is common practice for messaging systems to have the capability of ensuring message identifier uniqueness.)

If DPU 30 is the originating node 10, DPU 30 will also include an operator command program 33 (shown in dotted lines in FIG. 3 because this program 33 will generally only be included if DPU 30 is the originating node 10). This program 33 results in a tracer message being sent from the originating node 10. The tracer message will follow the path of the lost message 20 until it finds the message being traced.

Also included in DPU 30 is a lost message checking program 33 that runs on each node in the network. This program receives the tracer message at each hop and checks to see if the lost message exists on the node in question. If the lost message is found, a reply message is returned to the originating node 10 and the location of the lost message (carried in the reply message) is displayed at the completion of the operator command on the originating node 10. If the message is not found on the intermediate node this program checks the persistent trace record storage to see if the lost message passed through the node and also determines where the lost message went next. It then sends the tracer message along the same route.

The steps taken by an intermediary data processing node 30 will now be discussed with reference to the flowchart of FIG. 4. At step 401, the node 30 determines whether a message received from another data processing apparatus has a flag set to indicate that the received message is traceable. At step 402, the node 30 stores an indication in local memory that the received message has the flag set to indicate that the received message is traceable (assuming that this is indeed the case) and for storing an indication of a next node which the node 30 has forwarded the received message on to.

At step 403, the node 30 receives a tracer message (originally sent by the originating node 10) which includes an indication of a lost message which the originating node 10 would like to find. At step 404, in response to receipt of the tracer message, the node 30 determines whether the lost message exists locally within the node 30 (e.g., in either a DLQ or a TXQ within node 30). If the lost message does so exist, the YES branch is taken at step 404 and then node 30 informs node 10 that the lost message has been found (step 405). If the lost message does not exist within the node 30, then the NO branch is taken at step 404 leading to step 406. At step 406, node 30 consults the local memory to determine where (i.e., to which neighboring node) the lost message was forwarded to after the lost message left node 30. And, at step 407, node 30 forwards on the tracer message to the identified neighboring node.

Figure 4:
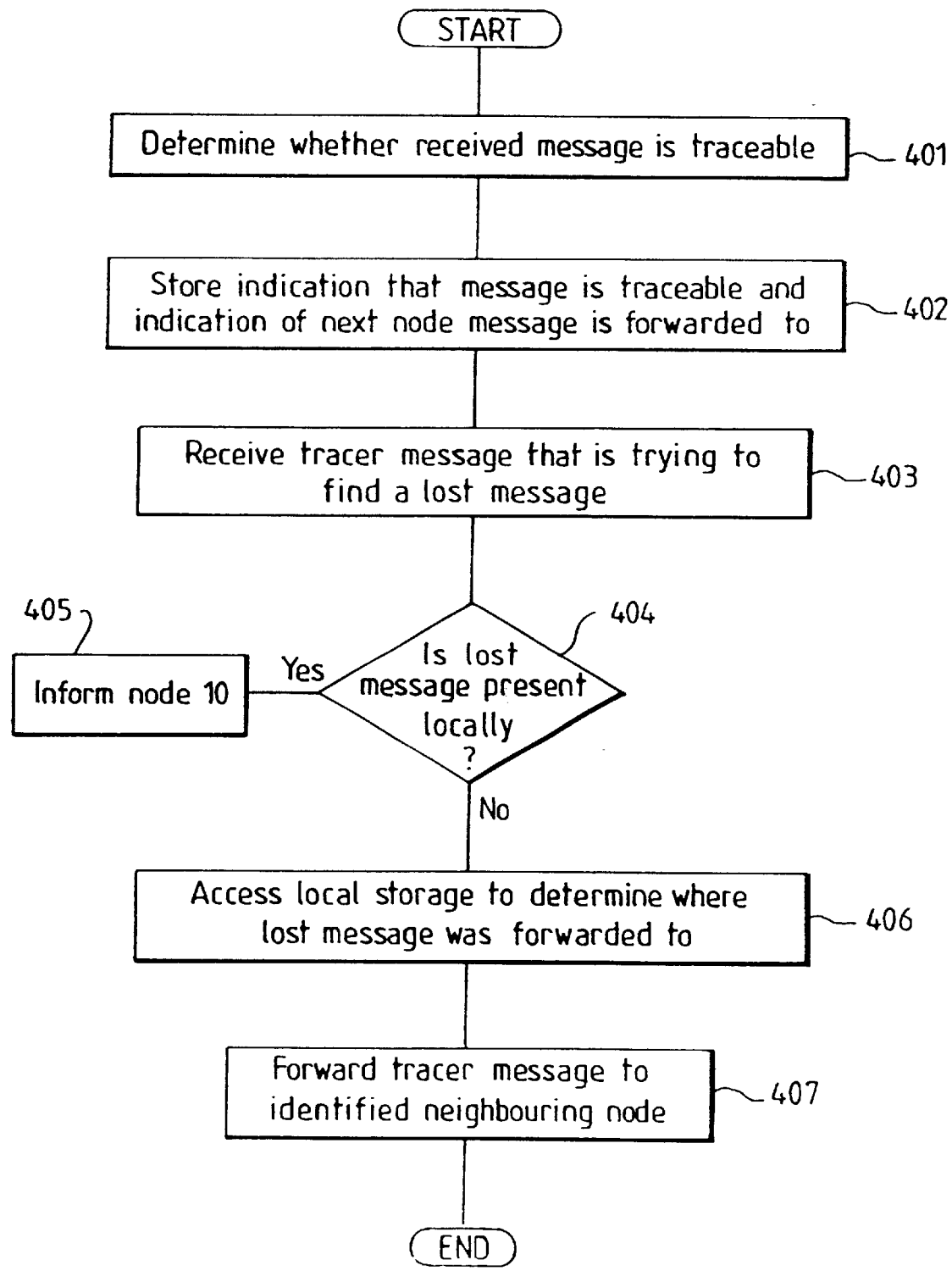
FIG. 4 is a flowchart showing the steps taken by a data processing node 30 according to preferred embodiment of the present invention.

Once the identified neighboring node receives the tracer message, that node will determine whether the lost message exists locally to that node and if not, it will forward the tracer message along the same path taken by the lost message (i.e., by following the flowchart of FIG. 4). In this way, eventually, the lost message will be found and its location will be reported back to the originating node 10 (via step 405).

Garbage Collection Policies

In order to work well in practice, a clear policy is needed to manage the storage, where the passage of traceable messages is recorded. Each node in the network will have such storage and if this was allowed to grow without a "garbage collection policy", it would eventually exhaust the storage available and would cause ever increasing performance degradation during searching. Several suitable methods for garbage collection exist, for example:

1) Each traceable message has a finite lifetime T. When this lifetime is exhausted, the message is deleted.

Hence a message is traceable for a defined period after which it cannot be traced. If a given message did not arrive inside a certain time period, either another tracer is sent for the message within the life time T (to extend the lifetime T for that message), or the lack of tracing is accepted.

2) When a message with the trace flag set is received at the destination, a reverse direction garbage collecting message is sent that removes all trace points associated with the path of the initial message. (Note that this technique requires that the trace information include the backward hop direction to be stored as well as the forward direction.)

3) The trace messages are stored in a fixed length FIFO queue. When the queue is full the oldest entry is discarded. This technique works well provided:
   a) the message network topology has not changed between the originating node 10 and the node where the lost message is located (i.e. nodes, links and routing information remain constant).
   b) an operator has not deleted the message.

Taking these cases in turn:

Topology Change

Here the lost message still exists on a transmission queue (TQX) or a dead letter queue (DLQ). However the tracer message cannot reach the lost message as the path to the lost message is broken. In this situation, the lost message checking program 33 at the node where the trace path is broken will find an invalid next hop record (since the original next hop traversed by the traced message no longer exists). When the program 33 finds this situation, it returns a reply message to the originating node 10 which identifies the node where the topology break occurred and the invalid next hop address. This data is displayed on the operator console at the originating node 10 and allows the operator to decide whether to work directly with the node in question to pursue the problem.

An operator has deleted the message

The class of service indicator provided by this technique can be detected by tools that the operator uses to delete messages, and can give a warning to the operator that the message is traceable and therefore important. A further addition to the deleting tools might be to record in the message trace store, evidence that the message has been deleted. This could then be returned to the originating node in the trace reply message and displayed on the operator console following a trace request. An addition to this technique could be to record the id of the operator who deleted the message or other audit information such as the deletion time, the process id that issued the delete (MQGET) etc.

The present invention is preferably embodied as a computer program product for use with a computer system. Such an implementation may comprise a series of computer readable instructions either fixed on a tangible medium, such as a computer readable media, e.g., diskette, CD-ROM, ROM, or hard disk, or transmittable to a computer system, via a modem or other interface device, over either a tangible medium, including but not limited to optical or analog communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable media with accompanying printed or electronic documentation, e.g., shrink wrapped software, pre-loaded with a computer system, e.g., on a system ROM or fixed disk, or distributed from a server or electronic bulletin board over a network, e.g., the Internet or World Wide Web.

We claim:

1. In an asynchronous message queuing network, a data processing method of finding a lost message, comprising steps of:

sending a first message from an originating data processing unit to an intermediate data processing unit, the message including an indication that the message is traceable;

sending a tracer message from an originating data processing unit to an intermediate data processing unit, the tracer message identifying the first message as a lost message which the originating data processing unit would like to find;

at the intermediate data processing unit, upon receiving the tracer message, checking to determine whether the first message exists within the intermediate data processing unit, and sending a reply message back to the originating unit if the first message is found within the intermediate data processing unit; and at the intermediate data processing unit, if the first message is not found within the intermediate data processing unit, determining whether the first message has passed through the intermediate data processing unit, and if the first message has passed through the intermediate data processing unit, determining a neighboring data processing unit which received the first message from the intermediate data processing unit and forwarding the tracer message to the neighboring data processing unit.

2. An intermediary data processing apparatus for use in an asynchronous messaging and queuing data processing network, the apparatus comprising:

receiving means for receiving a message from a first data processing apparatus;

forwarding means for forwarding the received message on to a second data processing apparatus;

determining means for determining whether a message received from the first data processing apparatus has a flag set to indicate that the received message is traceable;

storing means for storing, in response to the determining means determining that a message has been received with the flag set, an indication that the received message has the flag set to indicate that the received message is traceable and for storing an indication of the second data processing apparatus which the forwarding means has forwarded the received message on to;

means for receiving a tracer message from the first data processing application, the tracer message including an indication of a lost message;

means for, in response to receipt of the tracer message, determining whether the lost message exists within the intermediary data processing apparatus, and, if the lost message does not exist within the intermediary data processing apparatus, consulting the storing means and using the stored indication of the second data processing apparatus to forward on the tracer message to the second data processing apparatus that corresponds to the stored indication, so that the tracer message follows the path taken by the lost message.

3. A data processing method taking place in an intermediary data processing apparatus for use in an asynchronous messaging and queuing data processing network, the method comprising steps of:

receiving a message from a first data processing apparatus;

forwarding the received message on to a second data processing apparatus;

determining whether a message received from the first data processing apparatus has a flag set to indicate that the received message is traceable;

storing, in response to the determining step determining that a message has been received with the flag set, an indication that the received message has the flag set to indicate that the received message is traceable and for storing an indication of the second data processing apparatus which the forwarding step has forwarded the received message on to;

receiving a tracer message from the first data processing application, the tracer message including an indication of a lost message;

in response to receipt of the tracer message, determining whether the lost message exists within the intermediary data processing apparatus, and, if the lost message does not exist within the intermediary data processing apparatus, using the stored indication of the second data processing apparatus to forward on the tracer message to the second data processing apparatus that corresponds to the stored indication, so that the tracer message follows the path taken by the lost message.

4. A computer program product, stored on a computer readable storage medium for, when run on a computer, carrying out the method of claim 3.

5. A computer program stored on a computer readable storage medium for, when run on a computer, carrying out the method of claim 1.

* * * * *